United States Patent

[11] 3,563,209

[72] Inventor Richard Paul Mommer
     Loveland, Colo.
[21] Appl. No. 840,445
[22] Filed July 9, 1969
[45] Patented Feb. 16, 1971
[73] Assignee Balcom Chemicals, Inc.
     Greeley, Colo.

[54] ANIMAL INSECTICIDE DUST DISPENSER BAG
     8 Claims, 4 Drawing Figs.
[52] U.S. Cl. ............................................... 119/159
[51] Int. Cl. ............................................... A01k 29/00
[50] Field of Search ...................................... 119/156,
         160; 119/159; 150/1, 3; 222/189; 132/79.4, 82.2

[56] References Cited
UNITED STATES PATENTS
3,364,900  1/1968  Knapp ........................... 119/159

Primary Examiner—Hugh R. Chamblee
Attorney—Wilbur A. E. Mitchell

ABSTRACT: An animal insecticide dust dispenser bag having a lower sifter opening and an upper filler opening, and a plurality of grommets in arc alignment adjacent the filler opening and adapted to receive a sagging-rope-holding means therethrough and so that the sifter opening edge of the bag is held in substantially a straight line.

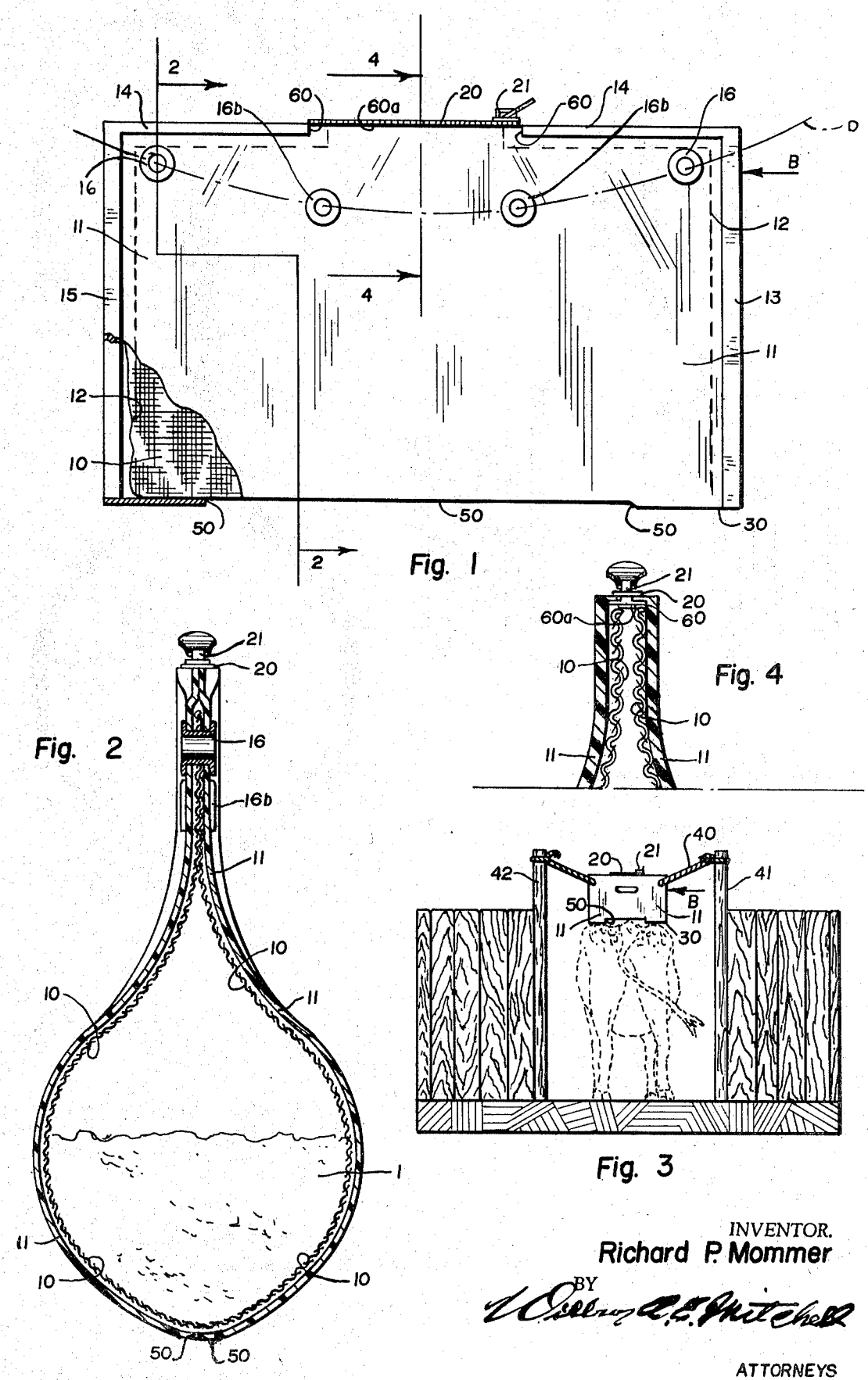

ANIMAL INSECTICIDE DUST DISPENSER BAG

This invention relates to animal husbandry, and more particularly to a suspended dust container applicator bag for livestock, for livestock self-application use.

My invention is a continuation in part of my copending application, Ser. No. 750,818, filed Aug. 7, 1968, entitled Animal Insecticide Dust Dispenser Bag, now Pat. No. 3,494,333.

The use of semiporous cloth bags, such as burlap, is known for dispensing dust on animals rubbing thereagainst. Such bags are sometimes held by a rigid straight bar or tight rope or wire extending between two uprights, and such extension bar or means usually becomes bent and sags during use. More usually those bags are suspended in use from a loose or sagging rope from and between two uprights. In either event, heretofore as far as known, the lower extremity of such a bag hangs as a circular bag surface, due to the sagging of the holding means, crosswise across the animal's back with a resultant excessive deposit of dust being inefficiently released from the bag on the animal rubbing thereagainst. Much of that dust, as a result, is lost into the atmosphere and wind and is not deposited onto the animal. Another problem with these bags heretofore has been their susceptibility to adverse weather conditions, during periods of high humidity and when it rains, resulting in the insecticide dust in the bag becoming wet and caking and thus hindering a sifting use of contents thereafter.

Another problem of such bags has been to provide a means for refilling such a bag once the dust contents has been exhausted on use.

The purposes of my invention are to overcome those many disadvantages.

It is a principal object of my invention to provide a novel porous insecticide animal dust self-dispenser elongated bag in combination with a sagging-rope-holding means therefor, and wherein the bag is designed to be held by that rope and with the lower edge of the bag positioned in a straight line for sifter distribution of the dust from that straight line lower bag edge onto the animal.

It is another principal object of my invention to provide such a novel animal self-applicator dust-dispensing elongated bag held by a sagging rope, with the lower edge of the bag held thereby in a straight horizontal line by the provision of suitable grommets inserted at an edge of the bag opposite the lower edge and through which the rope is threaded and which grommets are positioned in an extended curved arc so that the sagging rope extending therethrough nevertheless holds the lower edge of the bag in said straight line.

Another principal object of my invention is the provision of such a porous insecticide dust dispenser bag having the exterior thereof of a suitable waterproof material to prevent loss and caking of the insecticide dust therein on certain wet or humid weather conditions.

A further object of my invention is the provision of such an animal suspended self-applicator dust-dispenser bag encased in a waterproof material, formed with a slot sifter opening at the lower edge of said waterproof material when the bag is suspended, and with a filler opening at a point on the bag remote from said sifter slot, operable closing means on the bag adjacent to and for closing said filler opening and operable for holding the filler slot closed in one position thereof and to permit a refilling of the porous bag upon exhaustion of the contents thereof in another position thereof.

Another object is the provision of a simple and inexpensive elongated waterproof material insecticide dust animal self-applicator dispenser bag, having a sifter slot opening through a portion thereof and with a porous material extending across that sifter opening, and having a filler slot opening at another portion thereof at a point remote from the sifter slot opening, and with means for suspending the bag with its lower edge being the edge having said sifter slot opening.

Another object is the provision of such a dust dispenser elongated bag having spaced grommet openings formed along one longitudinal edge thereof arranged substantially in an arc, and adapted to receive a sagging rope threadingly extended therethrough, whereby, upon the ends of such a rope extension therethrough being secured to adjacent uprights, that the lower edge of the bag will be held thereby in a horizontal plane.

Other and further objects will be apparent to those skilled in the art from the following detailed explanation and drawings of a preferred embodiment of my invention, and in which drawing:

FIG. 1 is a side view of my novel animal self-applicator dust dispenser bag, with the left lower corner of the outer waterproof portion there being broken away for better understanding.

FIG. 2 is a cross-sectional view thereof, taken on the line 2—2 of FIG. 1 and looking in the direction of the arrows.

FIG. 3 is a reduced diagrammatical view showing my novel suspended dispenser bag, in the self-application use thereof by a cow, and as viewed from the rear of the cow.

FIG. 4 is a partial cross-sectional view taken on the line 4—4 of FIG. 1, looking in the direction of the arrows.

In this preferred embodiment of my invention, I use a loosely woven burlap material elongated bag, 10, completely enclosed, as by sewing at the seams 12, except for a gap at the upper edge, as illustrated at 60, leaving an unsewed gap 60a centrally of that upper edge, to provide a filler slot opening through which to insert insecticide dust into the interior thereof. It will be understood that the filling is done by conventional means, as by a funnel through opening 60a. I completely encase the burlap bag, 10, by a suitable flexible sheet of waterproof material, 11, such as of polyethylene, as by folding a flat sheet thereof completely over the burlap bag, 10. Sheet 11 is heat-sealed at its outer three overlapped edges 13, 14 and 15, except that the portion 60, of 14 adjacent the opening 60a, of the inner bag, 10, is not so sealed, so as to have an aligned opening or entrance with 60a for filling the interior of the inner bag, 10. I suitably secure a manually operable conventional holding means, cooperatively secured to the sides of that slot 60 of the outer bag, 11, such as a conventional zipper, 20, with a conventional slide closing fastener 21, cooperating with the edges of that slot. The zipper is opened for purpose of filling the bag, through 60a, and then the zipper is manually closed after that filling and until necessary to refill the bag.

In this embodiment of my novel bag, I punch-press clampingly insert and affix suitable metal ring conventional grommets, 16, 16b, 16b and 16, through all layers of said outer and inner bags. Those grommets are positioned in a downwardly directed arc and also in a common vertical plane. The grommets conventionally hold the material sheets together, where they are inserted through the four layers thereof, of the two bags. Each grommet has about a 1-inch inside diameter opening to accommodate a suitable holding means, as by a hemp rope 40 threaded therethrough, to thereby suspendingly hold the bag B, as illustrated in FIG. 3. Outer bag 11 has a sifter opening 50 formed as a slot at its lower edge, for reason to be explained. In FIG. 3 I illustrate how I suspend my novel bag between two upright posts, by a sagging rope 40, with the bag elevated to permit a cow to walk thereunder and with the lower edge of the bag substantially in a horizontal plane and crosswise contacting the cow's back as the cow passes thereunder. Thereby the rubbing movement of the cow under and against the lower edge 30 of the bag causes the dust in the bag to be sifted through inner porous bag 12 and out that lower sifter opening 50 of the outer bag onto the cow.

By substantially aligning the plurality of grommets, 16, 16b, 16b and 16 in the explained downwardly extending arc curve, parallel with upper edge 14 by the dotted line D, the bag will thereby be held by that sagging rope threaded through those grommets, as illustrated in FIG. 3, as a result, with that lower edge 30 of the bag held substantially in a horizontal straight line. It is apparent and important that I place those grommets 16, 16b, 16b and 16 in that downwardly extended illustrated arc curve, so that thereby the sagging rope holding means 40, threaded therethrough, thereby holds the lower edge 30 of the dust loaded bag, with its sifter opening 50 in that horizontal straight line plane across the cow's back. Otherwise, were a sagging rope to be extended through straight line aligned grommets, the lower edge of the insecticide bag held thereby would be in a rounded lower edge bag arc, equivalent to that of the sagging rope, and much waste of the dust upon contact with the back of the cow would result, because of the space between that lower rounded bag edge in such event and the cow's back rubbing thereagainst.

This modification, of my novel animal self-applicator, waterproof exterior, insecticide dust dispenser bag, provides a way for its reuse, upon the dust contents thereof becoming exhausted, by providing the aligned filler opening slots 60 and 60a, at the point through both the inner and outer materials 10 and 11 remote from the sifter opening slot 50 thereof. That filler slot 60, of the outer material, is adapted to be opened and closed by the conventional slide fastener 20–21, as explained. When the insecticide dust is inserted, when that filler slot 60 is open, the dust may then be inserted through that slot, and trough 60a when it will enter into the interior of the bag 10 by passing between the inner pair of grommets 16b, when the bag is held with the filler slot 60a uppermost.

It will, of course, be understood that there are other methods of assembling my novel composite dust animal self-applicator dispenser bag, as by having one bag of waterproof material, with a closable filler opening adjacent its top, and as with a normally open sifter opening at its lower edge having a gusset of porous material fastened over that sifter opening, and with the plurality of downwardly extending crescent curve aligned grommet openings therethrough at a point in alignment with and opposite that type lower sifter opening. While not illustrated, there could be such a modification of my novel dust dispenser bag, similar to the form as illustrated in FIG. 1, but by eliminating the entire inner porous bag 10, and in its stead providing such a porous piece of material secured to that portion only of the waterproof polyethylene bag 11, adjacent to and extending across the normally open sifter slot 50 at the lower edge thereof, as being within the teaching of my invention.

A preformed elongated polyethylene bag could be used instead of the illustrated outer material 11, with preformed conventional manually operable rolled and crimped edges at the upper filler slot longitudinal upper side opening thereof, instead of the operable zipper for that filler opening. That type of a preformed crimped edge slot has a conventional manually operable slot-holding means at one edge thereof cross-sectionally formed as a male edge and the other edge thereof on the opposing side cross-sectionally formed as a conventional female edge, adapted for manual closing operation.

I thus have provided a novel animal self-applicator dust weatherproof elongated dispenser composite bag, adapted to be held by a sagging rope means but yet with the lower dispenser or sifter edge position thereof held in a horizontal straight line. The porous material of inner bag 10 is designed to normally contain the dust therein, until agitation caused by an animal rubbing against the composite bag. As illustrated in FIG. 3, the bag is suspended by such a rope with its lower edge high enough to permit a cow to just walk thereunder and yet so that the bag will contact and rub against the animal's back as the animal proceeds under the lower edge of the bag. It will be understood, in this modification, that, while I preferably show the lower edge or sifter slot 50 as normally always open, that a manually operable closing means, such as an operable zipper in association with the adjacent edges of the waterproof bag 11, at that slot, could be provided, if desired, so that when the bag is not in use that zipper could be placed in a closed relationship to save loss of dust, on accidental agitation of the composite bag.

In the operation of my bag, as the animal proceeds thereunder, the lower edge of the bag contacts the animal's back, and the animal rubs the underside of that bag adjacent to that sifter slot 50, and that causes the insecticide dust I in the porous bag 10, to sift through that porous material of that inner bag 10 adjacent or across that slot 50, and that dust then falls and is deposited over the cow's back rubbing thereagainst, known as self-animal application.

Many changes and modifications may be made in my invention, as explained and described in the preferred embodiment shown and described herein; within the scope, spirit and teaching thereof. I therefore wish to be bound only by the hereunto appended claims.

I claim:

1. An animal self-applicator elongated bag for dispensing insecticide dust, comprising, in combination, an inner porous first sifter bag adapted normally to hold said dust, a second outer waterproof bag enclosing the first bag, said two bags having a plurality of grommets aligned in a downwardly extending arc and secured through said two bags on an edge remote from the sifter slot opening of the second bag, means for elevatingly suspending said bag with the lower edge of the bag opposite the grommets being held in a straight line and in a position to be agitated by an animal rubbing thereagainst and including a sagging rope extending through said plurality of grommets, said second bag having a dust sifter slot opening at an edge thereof substantially opposite from said rope grommets, said sifter bag having a filler opening therein remote from said sifter slot opening and adapted for dust to be inserted therethrough and thereinto, and an operable filler opening closing means secured to one or the other of said bags and adjacent said filler opening of the first bag and being adapted for operably holding said filler opening closed in one position thereof.

2. An animal self-applicator insecticide dust bag, comprising in combination, a flexible waterproof bag, adapted to receive dust therein and having a first and sifter opening formed in the wall thereof, a coarse mesh clothlike means secured to said bag and extending across said opening, a second filler opening formed in the wall of said bag at a point remote from said first opening, manually operable closing means secured to the bag adjacent said second and filler opening and operable in more than one position and adapted to hold said second filler opening closed in one operative position thereof, and grommet holding means secured to two points on the bag substantially opposite from said first sifter opening and adapted to receive a holding means therein to suspend the bag from suspension points to permit animal agitation against said first and sifter opening portion of the bag.

3. A bag as described in claim 2 and characterized further by the definition of the manually operable closing means being a zipperlike closing means secured to the bag adjacent to that second and filler opening and operable in more than one position and adapted to be operatively moved into one position to hold said second opening closed.

4. An animal self-applicator insecticide dust-dispensing bag, adapted to be saggingly suspended from a rope adjacent upright points and effect discharge of insecticide dust therefrom in a straight line, having longitudinally extending upper and lower portions; said lower portion including elongated dust delivery means that extend in a straight line; a plurality of grommet openings formed in the upper portion of the bag, said grommet openings being located on a line defined by a downwardly extending arc which is positioned so that a straight line that is tangent to said arc at its midpoint is parallel to the straight line of the delivery means, said delivery means including a delivery opening formed in a waterproof material and a clothlike material means extending across said delivery opening.

5. An animal self-applicator insecticide dust-dispensing bag as defined in claim 4 wherein said clothlike material means is a porous container.

6. An animal self-applicator insecticide dust-dispensing bag as defined in claim 4 wherein said upper and lower portions of said bag terminate in parallel upper and lower edge means and the delivery opening is formed in the lower edge means.

7. An animal self-applicator insecticide dust-dispensing bag as defined in claim 6 wherein the upper edge means includes spaced edges that are permanently secured together except for a minor portion thereof that provides a filling opening; the edges of said minor portion being provided with cooperating openable closing means.

8. In combination, an animal self-applicator insecticide dust-dispensing bag having longitudinally extending upper and lower portions; an elongated dust delivery means formed in said lower portion, said dust delivery means extending in a straight line; a plurality of grommet openings formed in the upper portion of said bag, said grommet openings being located on a line defined by a downwardly extending arc; said arc being positioned so that a straight line that is tangent to said arc at its midpoint is parallel to the straight line of the delivery means and a sagging rope extends through the grommet openings from adjacent upright points for saggingly suspending and thereby effecting a holding of the bag with the delivery means thereof held in substantially a straight line; said delivery means including a delivery opening formed in a waterproof material, and a porous clothlike container extending across said delivery opening, said upper and lower portions of said bag terminating in parallel upper and lower edge means, said delivery opening being formed in said lower edge means.